US012695038B2

(12) United States Patent
Yoshioka

(10) Patent No.: US 12,695,038 B2
(45) Date of Patent: Jul. 28, 2026

(54) BREAKER, SAFETY CIRCUIT AND SECONDARY BATTERY PACK

(71) Applicant: Bourns KK, Suita (JP)

(72) Inventor: Masaki Yoshioka, Suita (JP)

(73) Assignee: Bourns KK, Suita (JP)

( * ) Notice: Subject to any disclaimer, the term of this patent is extended or adjusted under 35 U.S.C. 154(b) by 213 days.

(21) Appl. No.: 18/694,464

(22) PCT Filed: Sep. 5, 2022

(86) PCT No.: PCT/JP2022/033234
§ 371 (c)(1),
(2) Date: Mar. 22, 2024

(87) PCT Pub. No.: WO2023/058379
PCT Pub. Date: Apr. 13, 2023

(65) Prior Publication Data
US 2025/0006444 A1      Jan. 2, 2025

(30) Foreign Application Priority Data

Oct. 6, 2021      (JP) ................................. 2021-164882

(51) Int. Cl.
| *H01H 37/10* | (2006.01) |
| *H01H 37/04* | (2006.01) |
| *H01H 37/46* | (2006.01) |
| *H01M 50/581* | (2021.01) |

(52) U.S. Cl.
CPC ............ *H01H 37/10* (2013.01); *H01H 37/04* (2013.01); *H01H 37/46* (2013.01); *H01M 50/581* (2021.01); *H01M 2200/10* (2013.01)

(58) Field of Classification Search
CPC ........ H01H 37/10; H01H 37/04; H01H 37/46; H01H 1/504; H01H 37/54; H01H 37/5427; H01H 37/5436; H01M 50/581; H01M 2200/10; H01M 2200/106
See application file for complete search history.

(56) References Cited

U.S. PATENT DOCUMENTS

| 2002/0003465 A1* | 1/2002 | Takeda | ............... | H01H 37/5427 |
| | | | | 337/298 |
| 2016/0035521 A1* | 2/2016 | Namikawa | ......... | H01H 37/5427 |
| | | | | 337/380 |
| 2020/0144009 A1* | 5/2020 | Namikawa | ............. | H01H 37/64 |
| 2021/0210297 A1* | 7/2021 | Namikawa | ............. | H01H 11/00 |

FOREIGN PATENT DOCUMENTS

| JP | 2017-098186 | 6/2017 |

\* cited by examiner

*Primary Examiner* — Jacob R Crum
(74) *Attorney, Agent, or Firm* — Muncy, Geissler, Olds & Lowe, P.C.

(57) ABSTRACT

The breaker comprises a fixed piece, a movable piece, a thermally-actuated element and a resin case. The fixed piece has an embedded portion embedded in the resin case in a region that overlaps with the thermally-actuated element in a plan view viewed in the thickness direction. The resin case has: an outer peripheral portion formed on the outer perimeter of a recessed portion; a first penetrating portion penetrating the recessed portion to expose the embedded portion to the thermally-actuated element side; an island portion interposed between the fixed piece and the thermally-actuated element in the inside of the first through portion; and a connecting portion connecting between the outer peripheral portion and the island portion.

16 Claims, 11 Drawing Sheets

BREAKER, SAFETY CIRCUIT AND SECONDARY BATTERY PACK

TECHNICAL FIELD

The present invention relates to a minisize breaker to be built into an electrical device, and the like.

BACKGROUND ART

Conventionally, breakers are used as protection devices (safety circuits) for secondary batteries, motors, etc. of various electrical devices (see, for example, Patent Document 1).

PRIOR ART DOCUMENT

Patent Document

Patent document 1: Japanese Patent Application Publication No. 2017-98186

SUMMARY OF THE INVENTION

Problems to be Solved by the Invention

In the breaker of the Patent Document 1, a thermally-actuated element formed in a rectangular shape is used.

The thermally-actuated element is formed by laminating thin plate materials having different coefficients of thermal expansion, and is curved convexly toward a movable piece under the normal condition.

However, when the electrical device is used in environments where it is exposed to extremely low temperatures, the curvature of the thermally-actuated element becomes excessively large.

As a result, there is a possibility that, under such a condition that four corners of the thermally-actuated element contact with (or interfere with) the resin case, a central portion of the thermally-actuated element pushes up the movable piece and the movable contact is separated from the fixed contact.

Further, even if the movable contact is not separated from the fixed contact, the contact pressure of the movable contact to the fixed contact decreases, and the contact resistance between the two contacts increases.

The present invention was made up in view of the above-mentioned circumstances, and its primary objective is to provide a breaker capable of providing stable conduction even when used at extremely low temperatures.

Means of Solving the Problems

A first invention of the present invention is a breaker comprises:

a fixed piece which has a fixed contact;

a movable piece which has an elastic portion being elastically deformable, and a movable contact in one end portion of the elastic portion, and which presses the movable contact so as to contact with the fixed contact;

a thermally-actuated element which is deformed in response to temperature changes so as to shift the movable piece from a conductive state in which the movable contact contacts with the fixed contact to a cut-off state in which the movable contact is separated from the fixed contact; and a resin case which has a recessed portion for accommodating the thermally-actuated element, wherein the fixed piece has an embedded portion which is embedded in the resin case in a region which, in a plan view viewed in the thickness direction of the fixed piece, overlaps with the thermally-actuated element, and the resin case has an outer peripheral portion which is formed on the outer perimeter of the recessed portion, a first penetrating portion which penetrates the recessed portion so as to exposes the embedded portion to the thermally-actuated element side, an island portion which is, in the inside of the first penetrating portion, interposed between the fixed piece and the thermally-actuated element, and a connecting portion which connects between the outer peripheral portion and the island portion.

In the breaker according to the present invention, it is preferable that the connecting portion comprises a rib protruding toward the thermally-actuated element.

In the breaker according to the present invention, it is preferable that the fixed piece has a through-hole, and the outer peripheral portion and the connecting portion are connected by resin filled in the through-hole.

In the breaker according to the present invention, it is preferable that the resin case has a bottom portion which covers a bottom surface of the fixed piece, and a window portion which penetrates the bottom portion and exposes the bottom surface.

In the breaker according to the present invention, it is preferable that the breaker comprises a PTC thermistor, and the island portion is provided with a second through-hole for attaching the PTC thermistor so that the fixed piece and the thermally-actuated element is electrically connected via the PTC thermistor.

In the breaker according to the present invention, it is preferable that the connecting portion includes a first connecting portion extending from the island portion to both sides in a longer direction of the movable piece, and a second connecting portion extending from the island portion to both sides in a shorter direction of the movable piece.

In the breaker according to the present invention, it is preferable that the connecting portion includes a third connecting portion extending from the island portion in the longer direction of the movable piece toward the opposite side to the fixed contact.

In the breaker according to the present invention, it is preferable that the resin case comprises a protrusion protruding from the island portion to both sides in the shorter direction of the movable piece.

In the breaker according to the present invention, it is preferable that the protrusion terminates before the outer peripheral portion.

A second invention of the present invention is a breaker comprises:

a fixed piece which has a fixed contact;

a movable piece which has an elastic portion being elastically deformable, and a movable contact in one end portion of the elastic portion, and which presses the movable contact so as to contact with the fixed contact;

a thermally-actuated element which is deformed in response to temperature changes so as to shift the movable piece from a conductive state in which the movable contact contacts with the fixed contact to a cut-off state in which the movable contact is separated from the fixed contact; and a resin case which has a recessed portion for accommodating the thermally-actuated element, wherein the fixed piece has an embedded portion which is embedded in the resin case in a region which, in a plan view viewed in the thickness direction of the fixed piece, overlaps with the thermally-actuated element, and the resin case has an outer peripheral portion which is formed on the outer perimeter of the recessed portion, a first penetrating portion which penetrates the recessed portion so as to exposes the embedded portion to the thermally-actuated element side, an island portion which is, in the inside of the first penetrating portion, interposed between the fixed piece and the thermally-actuated element, a bottom portion which covers a bottom surface of the fixed piece, and a window portion which penetrates the bottom portion and exposes the bottom surface.

In the breaker according to the present invention, it is preferable that the first penetrating portion and the window portion partially overlap in the plan view.

In the breaker according to the present invention, it is preferable that the thermally-actuated element is formed in a rectangular shape in the plan view, and the first penetrating portion is provided at positions opposed to the four corners of the thermally-actuated element.

The present invention is a safety circuit for an electrical device, comprising the breaker.

The present invention is a secondary battery pack comprising the breaker.

Effects of the Invention

In the breaker of the present invention, since the first penetrating portion is formed in the resin case, even if the thermally-actuated element becomes excessively deformed at low temperatures, interference between the thermally-actuated element and the resin case is avoided. This prevents the movable piece from being pushed up by the central portion of the thermally-actuated element, and stable conduction can be obtained.

4

Figure 7:
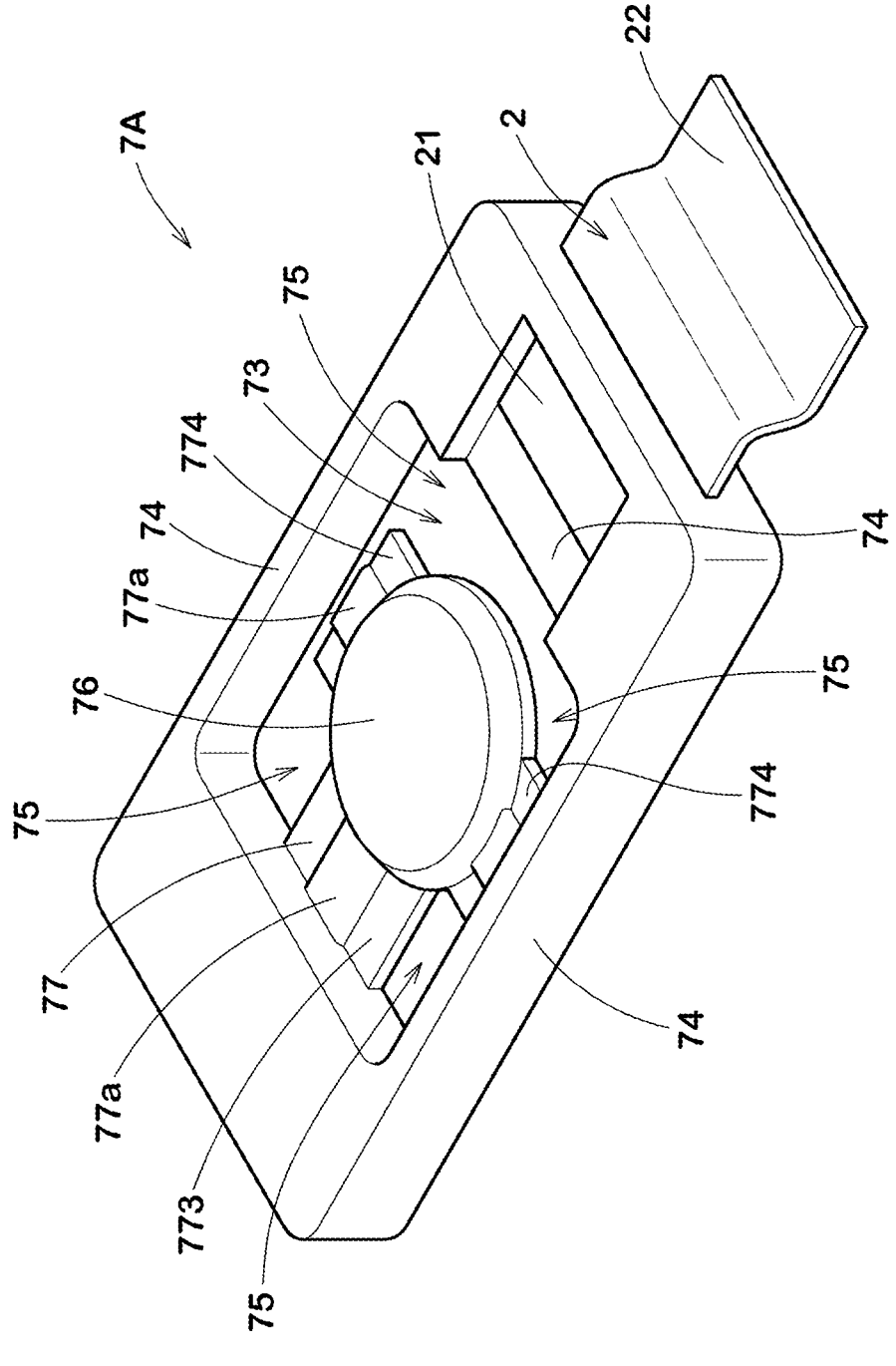
FIG. 7 is a perspective view showing a modified example of the case main body in FIG. 4 and the fixed piece.
Figure 9:
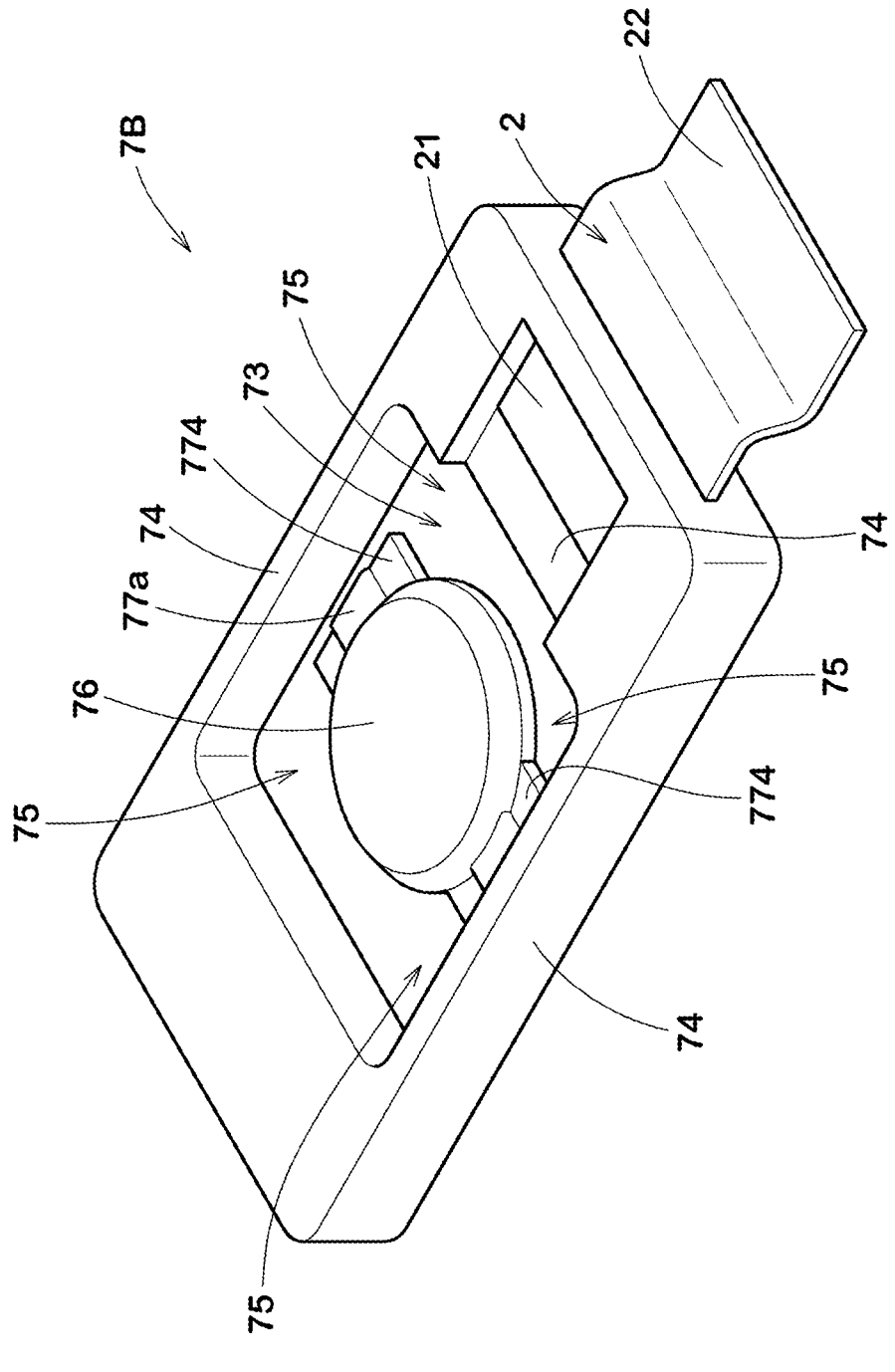

FIG. 9 is a perspective view showing a modified example of the case main body in FIG. 7 and the fixed piece.

Figure 10:
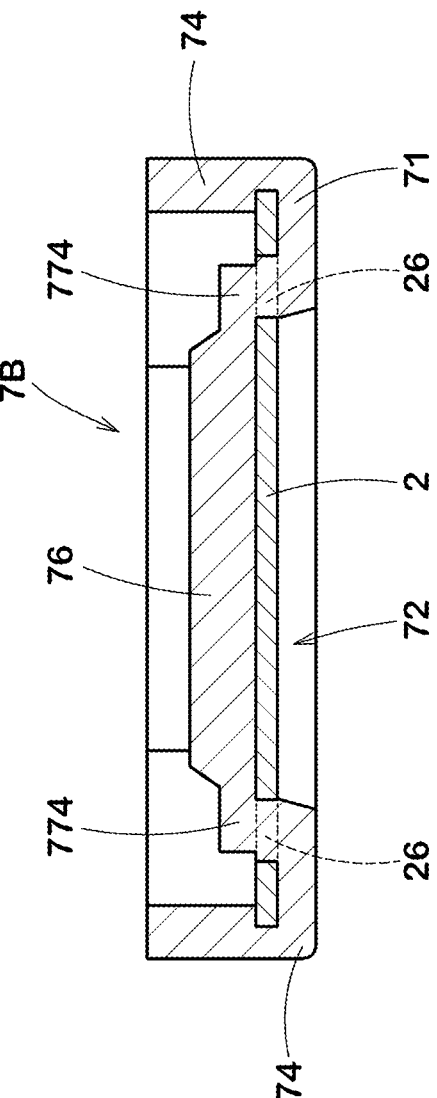

FIG. 10 is a cross-sectional view perpendicular to the longer direction of the case main body and fixed piece in FIG. 9.

Figure 11:
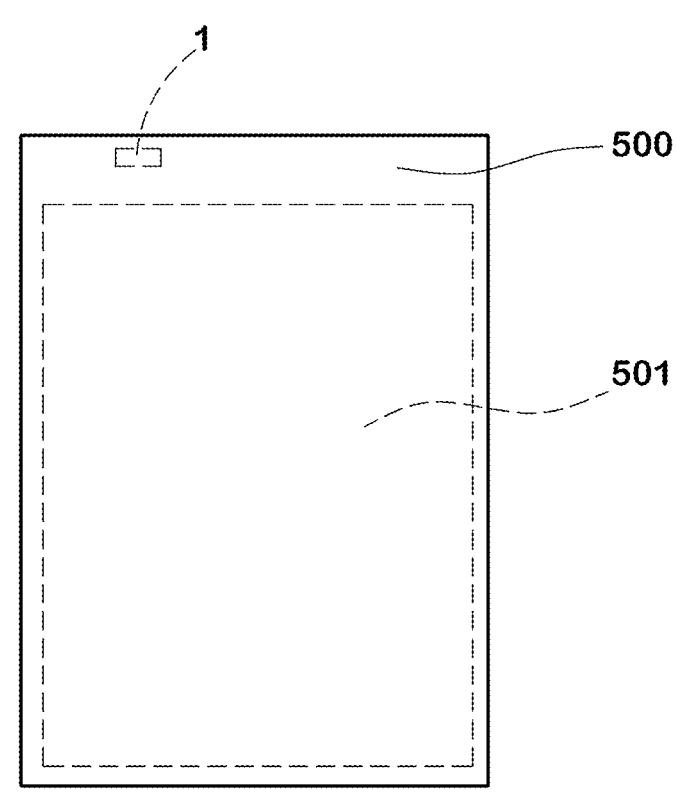

FIG. 11 is a plan view showing the configuration of a secondary battery pack equipped with the above-described breaker of the present invention.

Figure 12:
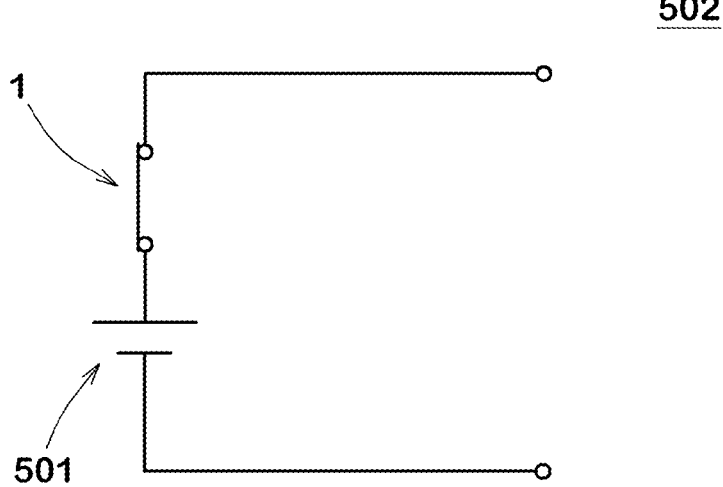

FIG. 12 is a circuit diagram of a safety circuit equipped with the above-described breaker of the present invention.

MODE FOR CARRYING OUT THE INVENTION

A breaker according to an embodiment of the present invention will be described with reference to the drawings.

Figure 1:
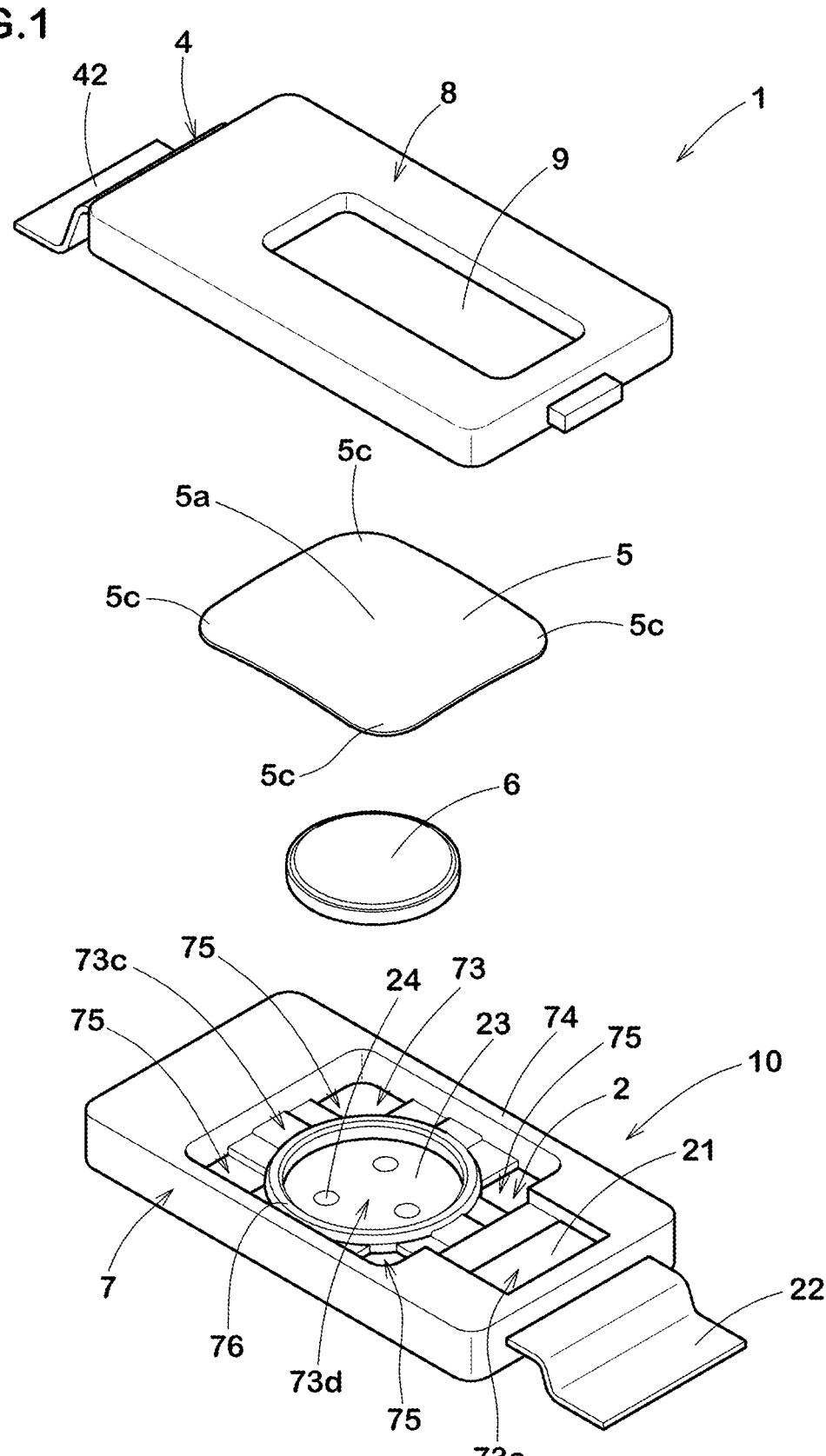
FIG. 1 is a perspective view showing a state before assembly of a breaker manufactured according to the present invention.
Figure 2:
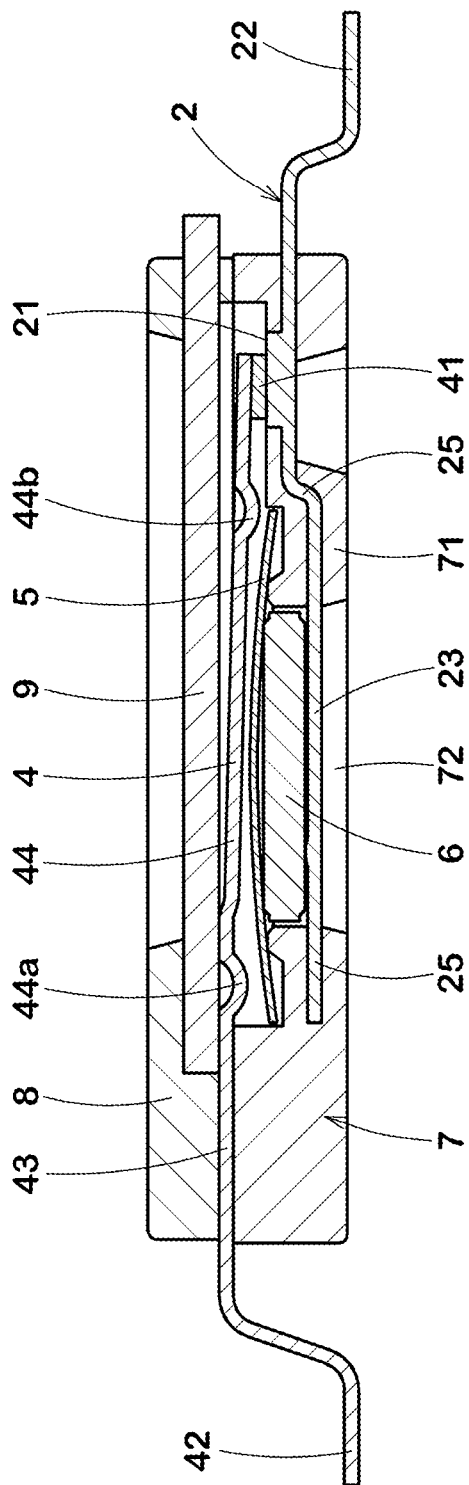
FIG. 2 is a cross-sectional view showing the breaker in its normal charging or discharging state.
Figure 3:
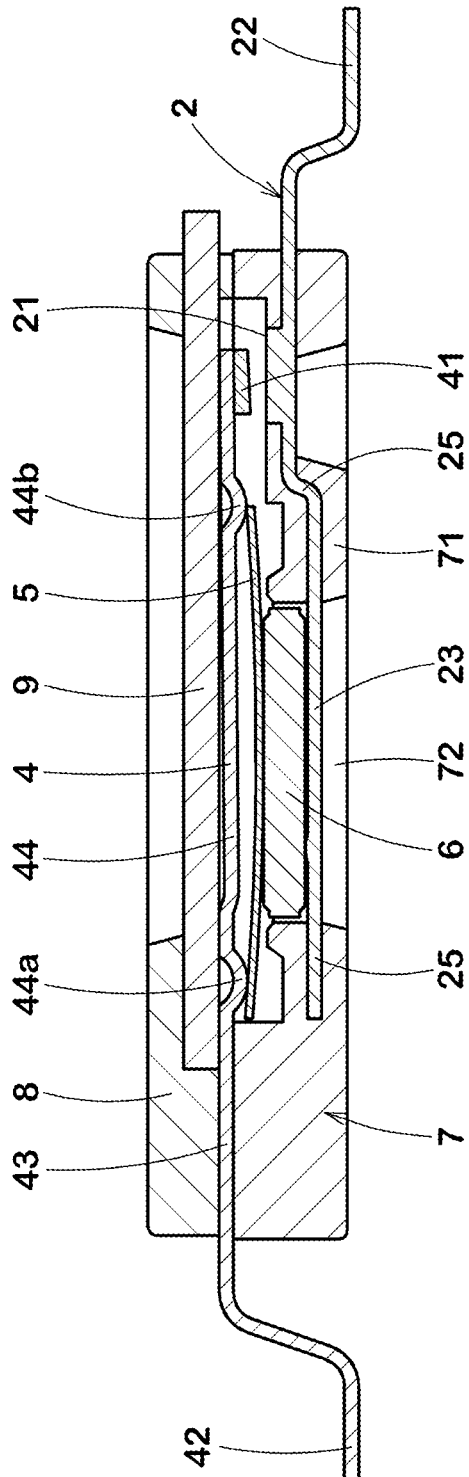
FIG. 3 is a cross-sectional view showing the breaker in its overcharged state or when abnormal.

FIGS. 1 to 3 show the configuration of a breaker 1 manufactured according to the present invention.

The breaker 1 is mounted on an electrical device and the like and protects the electrical device from excessive temperature rise or overcurrent.

The breaker 1 comprises a fixed piece 2 having a fixed contact 21, a movable piece 4 having a movable contact 41 in one end portion, a thermally-actuated element 5 which is deformed with temperature changes, a PTC (Positive Temperature Coefficient) thermistor 6 and a resin case 10 housing the fixed piece 2, the movable piece 4, the thermally-actuated element 5 and the PTC thermistor 6, The resin case 10 is composed of a case main body (first case) 7, a lid member (second case) 8 attached to the upper surface of the case main body 7, and the like.

The fixed piece 2 is formed by pressing a metal plate containing, as its main component, for example, copper or the like (in addition to this, a metal plate of copper-titanium alloy, nickel silver, brass or the like), and is embedded in the case main body 7 by insert molding.

The fixed piece 2 is provided, on one end side thereof, with a terminal 22 electrically connected to an external circuit, and, on the other end side, with a support portion 23 for supporting the PTC thermistor 6.

The terminal 22 protrudes to the outside of the case main body 7.

The PTC thermistor 6 is placed on convex projections (dowels) 24 formed at three positions on the support portion 23 of the fixed piece 2, and is supported by the projections 24.

As the fixed piece 2 is bent in a stepwise manner, the fixed contact 21 and the support portion 23 are arranged at different levels, and a space for storing the PTC thermistor 6 is easily secured.

The fixed contact 21 is formed at a position opposite to the movable contact 41 by cladding, plating, welding, coating, etc. with a highly conductive material such as silver, nickel, nickel-silver alloy, copper-silver alloy, or gold-silver alloy, and is exposed through a part of am opening 73a formed inside the case main body 7.

The terminal 22 projects outward from an edge of the case main body 7.

The support portion 23 is exposed through an opening 73d formed inside the case main body 7.

In this application, unless otherwise noted, the description is made on that, in the fixed piece 2, the surface on which the fixed contact 21 is formed (i.e., the upper surface in FIG. 1) is the first surface, and the opposite surface is the second surface.

The same applies to other parts such as the movable piece 4, the thermally-actuated element 5, the PTC thermistor 6, the resin case 10 and the like.

The movable piece 4 is formed into an arm shape which is symmetrical with respect to a centerline in the longer direction, by pressing a plate-shaped metal material whose main component is copper or the like.

A part of the movable piece 4 (the after-mentioned embedded portion 43) is embedded in the lid member 8 by insert molding.

In one end portion of the movable piece 4 in the longer direction, a movable contact 41 is formed.

The movable contact 41 is made of the same material as the fixed contact 21, for example, and is joined to the one end portion of the movable piece 4 by welding, cladding, crimping, or other methods.

At the other end portion of the movable piece 4, there is formed a terminal 42 electrically connected to an external circuit.

Between the movable contact 41 and the terminal 42, there is formed the embedded portion 43 which is embedded and fixed in the lid member 8.

The embedded portion 43 is arranged on the terminal 42 side.

The movable piece 4 has an elastic portion 44 between the movable contact 41 and the embedded portion 43.

The elastic portion 44 extends from the embedded portion 43 toward the movable contact 41.

The movable piece 4 is cantilever-supported by the lid member 8 at the embedded portion 43 on a base end side of the elastic portion 44. And in this state, as result of the elastic portion 44 being elastically deformed toward the first surface, the movable contact 41 formed in the tip end portion of the elastic portion 44 is pressed toward the fixed contact 21 and comes into contact therewith, and thereby the fixed piece 2 and the movable piece 4 becomes conductive.

It is preferable that the movable piece 4 is curved or bent at the elastic portion 44 by press working.

The degree of curvature or bending is not particularly limited as long as the thermally-actuated element 5 can be accommodated, and may be arbitrarily set in consideration of the elastic force at the operating temperature and reset temperature, the pressing force of the contact, etc.

Further, on the second surface of the elastic portion 44, there are formed a pair of protrusions (contact parts) 44a, 44b so as to face the thermally-actuated element 5.

The projections 44a, 44b are in contact with the thermally-actuated element 5, and the deformation of the thermally-actuated element 5 is transmitted to the elastic portion 44 via the projections 44a, 44b (see FIGS. 1, 2 and 3).

The thermally-actuated element 5 is disposed between the movable piece 4 and the PTC thermistor 6.

That is, the thermally-actuated element 5 is placed on the first surface of the PTC thermistor 6, which will be described later.

The thermally-actuated element 5 shifts the state of the movable piece 4 from a conductive state in which the movable contact 41 contacts with the fixed contact 21 to a disconnected state in which the movable contact 41 is separated from the fixed contact 21.

The thermally-actuated element 5 is formed into a plate shape by laminating thin plate materials having different coefficients of thermal expansion, and has an initial shape whose cross section is curved into an arc.

The curved shape of the thermally-actuated element 5 is reversely warped with a snap motion when the reverse-operation temperature is reached due to overheating, and is restored when the temperature drops below the normally-reset temperature due to cooling.

The initial shape of the thermally-actuated element 5 can be formed by press working.

The material and shape of the thermally-actuated element 5 are not particularly limited as long as the thermally-actuated element 5 pushes up the elastic portion 44 of the movable piece 4 due to the reversely-warping deformation at the desired temperature, and is returned to its original state by the elastic force of the elastic portion 44. However, from the viewpoint of productivity and efficiency of reversely-warping deformation, a rectangular shape is preferred.

As to the materials for the thermally-actuated element 5, two types of materials having different thermal expansion coefficients made of various alloys, e.g. nickel silver, brass, stainless steel and the like are used in combination as a laminated material depending on the required conditions.

For example, as a material for the thermally-actuated element 5 that can provide stable reverse-operation temperature and normally-reset temperature, preferred is a combination of a copper-nickel-manganese alloy on the high expansion side and an iron-nickel alloy on the low expansion side.

Further, a material which is more desirable from the viewpoint of chemical stability, includes a combination of an iron-nickel-chromium alloy on the high expansion side and an iron-nickel alloy on the low expansion side.

Furthermore, a material which is more desirable from the viewpoint of chemical stability and processability, includes a combination of an iron-nickel-chromium alloy on the high-expansion side and an iron-nickel-cobalt alloy on the low-expansion side.

When the movable piece 4 is in the cut-off state, the PTC thermistor 6 makes it conductive between the fixed piece 2 and the movable piece 4 via the thermally-actuated element 5.

The PTC thermistor 6 is disposed between the fixed piece 2 and the thermally-actuated element 5. That is, the support portion 23 of the fixed piece 2 is located directly below the thermally-actuated element 5 with the PTC thermistor 6 in between.

When the current flow between the fixed piece 2 and the movable piece 4 is cut off due to the reversely-warping deformation of the thermally-actuated element 5, the current flowing through the PTC thermistor 6 is increased.

As long as the PTC thermistor 6 is a positive characteristic thermistor whose resistance increases as the temperature rises and limits its current, the type can be selected depending on the operating current, operating voltage, operating temperature, reset temperature, etc. And the material and shape are not particularly limited as long as these characteristics are not impaired.

In this embodiment, a ceramic sintered body containing barium titanate, strontium titanate, or calcium titanate is used.

In addition to the ceramic sintered body, a so-called polymer PTC, which is a polymer containing conductive particles such as carbon, may be used.

The case main body 7 and lid member 8 constituting the resin case 10, are molded from thermoplastic resin such as flame-retardant polyamide, polyphenylene sulfide (PPS) with excellent heat resistance, liquid crystal polymer (LCP), and polybutylene terephthalate (PBT).

As long as properties equivalent to or better than those of the resins described above can be obtained, materials other than resins may be used.

On the first surface side of the case main body 7, there is formed a recessed portion 73 which is an internal space for accommodating the movable piece 4, the thermally-actuated element 5, the PTC thermistor 6 and the like.

The recessed portion 73 has an opening 73*a* for the reception of the movable piece 4, an opening 73*c* for the reception of the movable piece 4 and the thermally-actuated element 5, an opening 73*d* for the reception of the PTC thermistor 6, and the like.

The edges of the movable piece 4 and the thermally-actuated element 5 mounted into the case main body 7 are brought into contact with frames forming the recessed portion 73 and guided when the thermally-actuated element 5 makes reversely-warping deformation.

That is, the recessed portion 73 accommodates the movable piece 4 and the thermally-actuated element 5 so that they can deform.

The lid member 8 is configured to cover the recessed portion 73.

The lid member 8 may be configured to cover at least a part of the recessed portion 73.

In the lid member 8, a cover piece 9 which is made of a metal plate containing copper or the like as a main component or made of stainless steel or the like, is embedded by insert molding.

The cover piece 9 is embedded in the lid member 8 in a state being in contact with the first surface of the movable piece 4.

The cover piece 9 limits the movement of the movable piece 4, and increases the rigidity and strength of the lid member 8 and consequently the resin case 10 as a housing, contributing to miniaturization of the breaker 1.

The case main body 7 and the lid member 8 are formed by injection molding using the above-mentioned resin material.

As already described, the fixed piece 2 is inserted in the case main body 7, and the movable piece 4 and the cover piece 9 are inserted in the lid member 8.

As shown in FIG. 1, the lid member 8 is attached to the case main body 7 so as to close the openings 73*a*, 73*b*, 73*c*, etc. of the case main body 7 housing the fixed piece 2, the movable piece 4, the thermally-actuated element 5, the PTC thermistor 6, etc.

The case main body 7 and the lid member 8 are joined by, for example, ultrasonic welding. Thereby, the resin case 10 is formed.

FIGS. 2 and 3 show the typical operations of the breaker 1.

FIG. 2 shows the operation of the breaker 1 in the normal charging or discharging state.

In the normal charging or discharging state, the thermally-actuated element 5 maintains its initial shape before being reversely warped.

When the movable contact 41 is pressed toward the fixed contact 21 by the elastic portion 44, the movable contact 41 and the fixed contact 21 come into contact with each other, and the fixed piece 2 and the movable piece 4 of the breaker 1 are placed in a state where they are electrically connected via the elastic portion 44 of the movable piece 4.

The elastic portion 44 of the movable piece 4 may be in contact with the thermally-actuated element 5.

In this case, the movable piece 4, the thermally-actuated element 5, the PTC thermistor 6 and the fixed piece 2 are electrically connected as a circuit.

But, as the resistance of the PTC thermistor 6 is overwhelmingly larger than the resistance of the movable piece 4, the current flowing through the PTC thermistor 6 is negligibly small in substance when compared with the amount flowing through the fixed contact 21 and the movable contact 41.

FIG. 3 shows the operation of the breaker 1 in an overcharged state or in an abnormal state.

The thermally-actuated element 5, which has a structure in which thin plate materials having different coefficients of thermal expansion are laminated, deforms as the temperature rises so that the initial curved shape shown in FIG. 2 is counteracted.

Then, the thermally-actuated element 5 which has reached the operating temperature snap-deformed into a reversely warped shape as shown in FIG. 3. Thereby, the thermally-actuated element 5 comes into contact with the elastic portion 44 of the movable piece 4, and the elastic portion 44 is pushed up by the thermally-actuated element 5, and as a result, the fixed contact 21 and the movable contact 41 are separated from each other.

At this time, the current flowing between the fixed contact 21 and the movable contact 41 is cut off. On the other hand, the thermally-actuated element 5 comes into contact with the movable piece 4, and a slight leakage current flows through the thermally-actuated element 5 and the PTC thermistor 6.

That is, the PTC thermistor 6 causes the fixed piece 2 and the movable piece 4 to be electrically connected via the thermally-actuated element 5 which caused the movable piece 4 to shift into the cut-off state.

As long as such leakage current flows, the PTC thermistor 6 continues to generate heat, and maintains the thermally-actuated element 5 in a reversely warped state to dramatically increases the resistance value, therefore, the current does not flow between the fixed contact 21 and the movable contact 41, and only the slight leakage current described above exists (constitutes a self-holding circuit).

This leakage current can be used for other functions of the safety device.

When the overcharged state is canceled or the abnormal state is eliminated, the heat generated by the PTC thermistor 6 stops, and the thermally-actuated element 5 returns to the normally-reset temperature and restores its original initial shape.

Then, the movable contact 41 and the fixed contact 21 come into contact with each other again due to the elastic force of the elastic portion 44 of the movable piece 4, and the circuit is released from the disconnected state and returns to the conductive state shown in FIG. 2.

Figure 4:
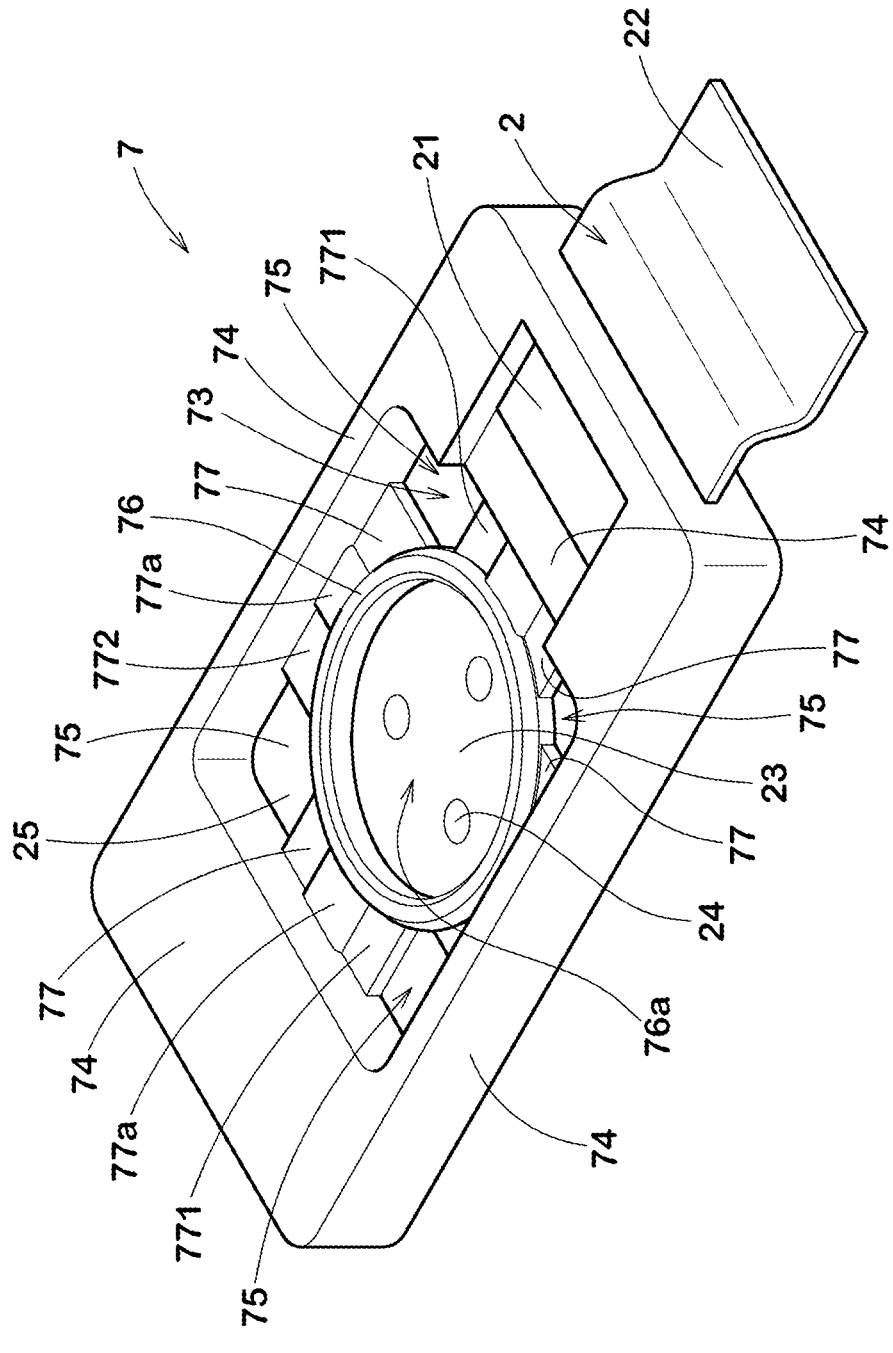
FIG. 4 is a perspective view showing a fixed piece and a case main body in FIG. 1.

FIG. 4 shows the case main body 7 in which the fixed piece 2 is embedded.

The fixed piece 2 has an embedded portion 25 which is embedded in the case main body 7 in the region overlapping with the thermally-actuated element 5 in a plan view viewed in the thickness direction of the fixed piece 2 (see FIGS. 1 to 3).

The embedded portion 25 in the present embodiment is arranged around the outer circumference of the support portion 23. Thereby, it possible to firmly support the PTC thermistor 6 via the support portion 23.

The case main body 7 has an outer peripheral portion 74, a first penetrating portion 75, an island portion 76, and a connecting portion 77.

The outer peripheral portion 74 is formed around the outer perimeter of the recessed portion 73. An end surface (first surface) of the outer peripheral portion 74 is welded to the lid member 8.

The first penetrating portion 75 penetrates the bottom of the recessed portion 73. Thereby, the first surface of the embedded portion 25 of the fixed piece 2 is exposed to the thermally-actuated element 5 side (recessed portion 73).

The island portion 76 is arranged inside the first penetrating portion 75.

The island portion 76 is interposed between the fixed piece 2 and the thermally-actuated element 5.

The connecting portion 77 connects between the outer peripheral portion 74 and the island portion 76. That is, the connecting portion 77 bridges between the outer peripheral portion 74 and the island portion 76 which are separated from each other by the first penetrating portion 75.

Figure 5:
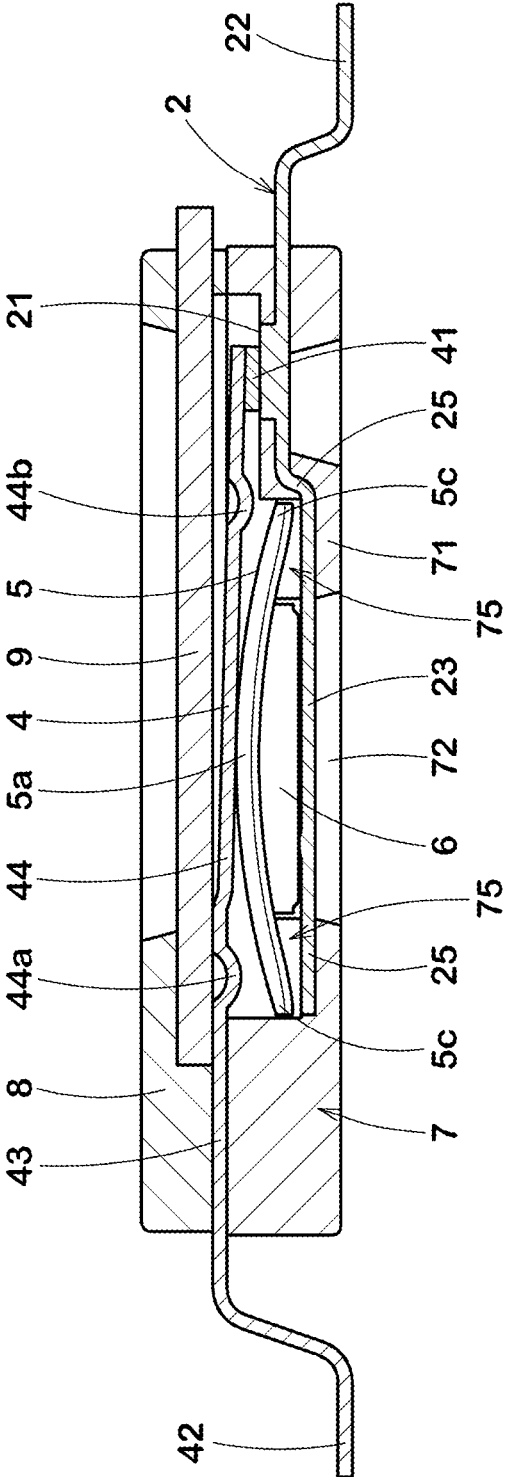
FIG. 5 is a cross-sectional view showing a breaker exposed to an extremely low temperature environment.

FIG. 5 shows a cross section of the breaker 1 exposed to an extremely low temperature environment (for example, in an atmosphere less than-15 degrees C.).

In the figure, for convenience of explanation, only the thermally-actuated element 5 and the PTC thermistor 6 are depicted in their entirety.

As shown in FIG. 2, in the breaker 1 in normal usage environments (for example, in an atmosphere of 10 degrees C. to 80 degrees C. without overcurrent), the thermally-actuated element 5 is curved in a convex manner toward the movable piece 4.

When the thermally-actuated element 5 is decreased in temperature from this state, the deformation (i.e. curvature) of the thermally-actuated element 5 becomes excessively large, and the protrusion of the central portion 5a of the thermally-actuated element 5 becomes increased.

Note that the temperatures of the extremely low temperature environment and the normal usage environment are not limited to the above ranges.

In the breaker 1 according to the present invention, since the first penetrating portion 75 is formed in the case main body 7 of the resin case 10, a clearance on the second surface side of the thermally-actuated element 5 is easily secured.

Therefore, even if the thermally-actuated element 5 deforms excessively at low temperatures, interference between the thermally-actuated element 5 and the case main body 7 can be easily avoided.

Thereby, the movable piece 4 is prevented from being pushed up by the central portion 5a of the thermally-actuated element 5, and the movable contact 41 is prevented from separating from the fixed contact 21.

Further, the contact pressure of the movable contact 41 against the fixed contact 21 is suppressed from decreasing, and the contact resistance between the two contacts is maintained low. Thereby, stable conduction can be obtained between the terminal 22 of the fixed piece 2 and the terminal 42 of the movable piece 4.

Furthermore, since the outer peripheral portion 74 and the island portion 76 separated by the first penetrating portion 75 are connected by the connecting portion 77, the case main body 7 becomes strong, and the contact state between the fixed contact 21 and the movable contact 41 is stabilized.

Therefore, even more stable conduction can be obtained between the terminal 22 of the fixed piece 2 and the terminal 42 of the movable piece 4.

It is preferable that the connecting portion 77 comprises a rib 77a protruding toward the thermally-actuated element 5.

The rib 77a makes the connecting portion 77 and consequently the case main body 7 even more strong.

Moreover, during molding the case main body 7, the fluidity of the resin material at the connecting portion 77 is increased, and the productivity is improved.

Figure 6:
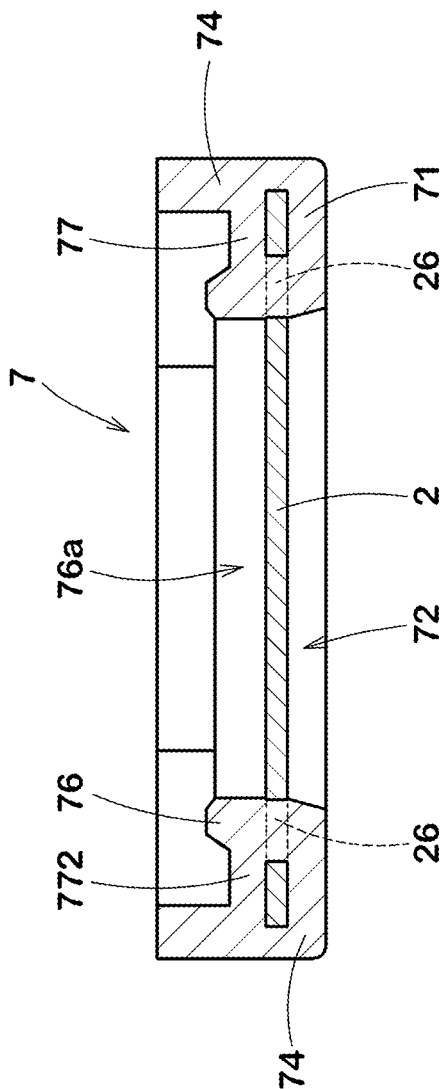
FIG. 6 is a cross-sectional view of the fixed piece and the case main body in FIG. 4.

FIG. 6 shows a cross section perpendicular to the longer direction of the case main body 7 and the fixed piece 2.

In this figure, for convenience, the thermally-actuated element 5 and the PTC thermistor 6 are depicted without being cut in the cross section.

The fixed piece 2 has a through-hole 26.

The through-hole 26 is formed in a region overlapping with the connecting portion 77 in a plan view viewed in the thickness direction of the fixed piece 2. The through-hole 26 is filled with the resin constituting the case main body 7. The resin filled in the through-hole 26 connects the outer peripheral portion 74 of the fixed piece 2 on the second surface side to the connecting portion 77 of the fixed piece 2 on the first surface side. Thereby, the case main body 7 becomes even more strong.

Further, when molding the case main body 7, the flow of the resin material from the outer peripheral portion 74 to the connecting portion 77 via the through-hole 26 is increased, and the productivity is improved.

The through-hole 26 may be formed in the shape of a slit extending along the longer direction of the case main body 7 and the fixed piece 2.

With such through-hole 26, it is possible to increase the strength and rigidity of the case main body 7 without increasing the width dimension in the shorter direction perpendicular to the longer direction.

The case main body 7 has a bottom portion 71 covering the bottom surface (second surface) 2a of the fixed piece 2, and a window portion 72 formed in the bottom portion 71.

The window portion 72 penetrates the bottom portion 71 and exposes the bottom surface 2a of the fixed piece 2 to the outside of the case main body 7.

In the present breaker 1, as shown in FIG. 4, a second penetrating portion 76a is formed in the island portion 76.

The second penetrating portion 76a penetrates the island portion 76.

The second penetrating portion 76a is formed in a shape corresponding to the PTC thermistor 6.

The PTC thermistor 6 is housed in the second penetrating portion 76a.

Thereby, the fixed piece 2 and the thermally-actuated element 5 can be electrically connected via the PTC thermistor 6.

It is preferable that the connecting portion 77 includes first connecting portions 771 extending from the island portion 76 to both sides in the longer direction of the movable piece 4, and second connecting portions 772 extending cut from the island portion 76 to both sides in the shorter direction of the movable piece 4.

The first connecting portions 771 and the second connecting portions 772 intersect at the island portion 76 in a "+" shape.

The first connecting portions 771 and the second connecting portions 772 provide a plurality of the connecting portions 77 each connecting between the outer peripheral portion 74 and the island portion 76, making the case main body 7 even more strong.

In addition, even if some external force is applied to the outer peripheral portion 74, the island portion 76 in which the second penetrating portion 76a is formed will flexibly deform, therefore, stress concentration on the connecting portion 77 (particularly the junction with the outer peripheral portion 74) is avoided, and damage of the case main body 7 is suppressed.

It is preferable that the first penetrating portion 75 and the window portion 72 partially overlap with each other in the plan view of the fixed piece 2.

Thereby, when molding the case main body 7, the fixed piece 2 can be accurately positioned by being sandwiched between the molds from the first penetrating portion 75 side and the window portion 72 side.

FIG. 7 is a perspective view showing a case main body 7A which is a modification of the case main body 7 and the fixed piece 2.

As to portions of the case main body 7A not explained below, the configuration of the case main body 7 described above may be adopted.

In the case main body 7A, the second penetrating portion 76a for accommodating the PTC thermistor 6 in the island portion 76, is eliminated. Therefore, in the breaker 1 to which the case main body 7A is applied, the PTC thermistor 6 is omitted.

Thereby, the configuration of the breaker 1 is simplified to reduce costs.

In the case main body 7A, the connecting portion 77 includes a third connecting portion 773.

The third connecting portion 773 extends in the longer direction of the movable piece 4 from the island portion 76 toward the side opposite to the fixed contact 21.

Since the outer peripheral portion 74 and the island portion 76 are connected by the third connecting portion 773, the case main body 7 becomes strong, and the contact state between the fixed contact 21 and the movable contact 41 is stabilized.

Therefore, even more stable conduction can be obtained between the terminal 22 of the fixed piece 2 and the terminal 42 of the movable piece 4.

The case main body 7A includes protruding portions 774 protruding from the island portion 76.

The protruding portions 774 protrude toward both sides in the shorter direction of the movable piece 4.

It is preferable that the protruding portions 774 terminate before the outer peripheral portion 74.

Due to such protruding portions 774, even if some external force is applied to the outer peripheral portion 74, the stress is not transmitted to the protruding portions 774 and the island portion 76, therefore, damage to the case main body 7 is suppressed.

It is preferable that the fixed piece 2 combined with the case main body 7A is also provided with a through-hole 26, similar to the fixed piece 2 shown in FIG. 6.

In this case, the through-hole 26 is formed in a region which overlaps with the protruding portions 774 in a plan view viewed in the thickness direction of the fixed piece 2 (see FIG. 10).

The through-hole 26 is filled with the resin constituting the case main body 7A. The resin filled in the through-hole 26 connects the outer peripheral portion 74 of the fixed piece 2 on the second surface side to the protruding portions 774 of the fixed piece 2 on the first surface side. Thereby, the case main body 7A becomes even more strong.

Further, when molding the case main body 7A, the flow of the resin material from the outer peripheral portion 74 to the protruding portions 774 via the through-hole 26 is improved, and the productivity is improved.

It is preferable that the protruding portion 774 comprises a rib 77a protruding toward the thermally-actuated element 5.

Due to the rib 77a, the protruding portion 774 and consequently the case main body 7A become more strong.

Moreover, the fluidity of the resin material in the protruding portions 774 is improved during molding of the case main body 7A, and productivity is improved.

Figure 8:
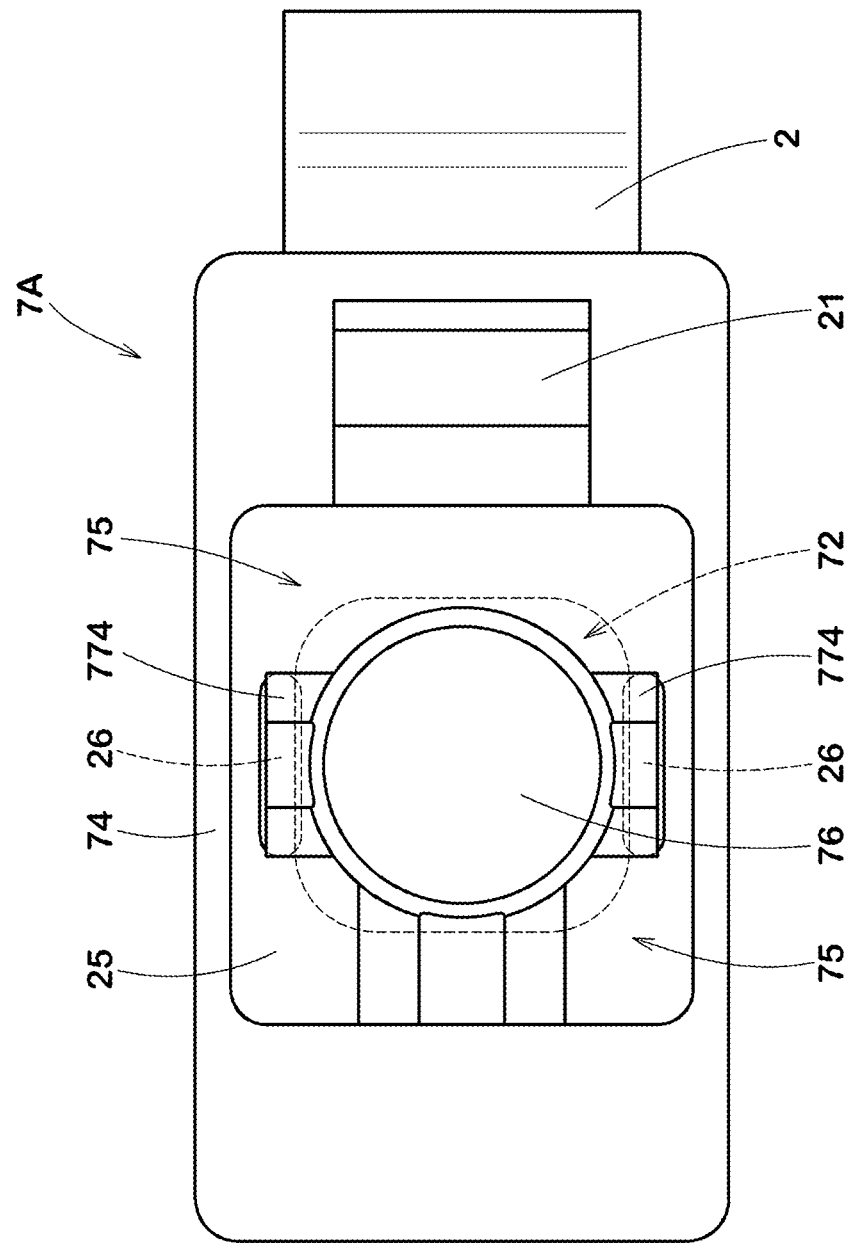
FIG. 8 is a plan view showing the fixed piece and the case main body in FIG. 7.

FIG. 8 is the plan view showing the case main body 7A and the fixed piece 2. It is preferable that the first penetrating portion 75 is provided at locations facing the four corners 5c of the thermally-actuated element 5 which is formed in a rectangular shape as shown in FIGS. 1, 4, 5, 7 and 8.

Thereby, the contact between the thermally-actuated element 5 and the case main body 7, 7A in extremely low temperature environments, can be more easily avoided (see FIG. 5), and stable conduction can be obtained between the terminals 22 of the fixed piece 2 and the terminals 42 of the movable piece 4.

FIG. 9 is a perspective view showing a case main body 7B which is a modification of the case main body 7A, and the fixed piece 2.

FIG. 10 shows a cross section perpendicular to the longer direction of the case main body 7B and the fixed piece 2.

As to portions of the case main body 7B not explained below, the configuration of the case main body 7, 7A described above may be adopted.

In the case main body 7B, the connecting portion 77 connecting between the outer peripheral portion 74 and the island portion 76 is eliminated.

That is, the case main body 7B has the outer peripheral portion 74, the first penetrating portion 75, the island portion 76, the bottom portion 71, and the window portion 72.

As shown in FIG. 10, the fixed piece 2 is provided with the through-hole 26. The through-hole 26 is filled with the resin constituting the case main body 7B. The resin filled in the through-hole 26 connects the outer peripheral portion 74 of the fixed piece 2 on the second surface side to the protruding portions 774 of the fixed piece 2 on the first surface side. Thereby, the case main body 7B becomes even more strong.

Further, when molding the case main body 7B, the flow of the resin material from the outer peripheral portion 74 to the protruding portions 774 via the through-hole 26 is improved, and productivity is improved.

In the case main body 7B, it may be possible to further eliminate the protruding portions 774 protruding from the island portion 76.

In this case, it is configured such that the resin filled in the through-hole 26 connects the outer peripheral portion 74 of the fixed piece 2 on the second surface side to the island portion 76 of the fixed piece 2 on the first surface side.

Even in the case main body 7B, it is preferable that the first penetrating portion 75 is provided at locations facing the four corners 5c of the thermally-actuated element 5 which is formed in a rectangular shape.

Thereby, similarly to the case main body 7, 7A, the contact between the thermally-actuated element 5 and the case main body 7B in extremely low temperature environments, can be more easily avoided, and stable conduction can be obtained between the terminals 22 of the fixed piece 2 and the terminals 42 of the movable piece 4.

While the breaker 1 according to the present invention has been described in detail above, the present invention can be embodied in various forms without being limited to the above-described specific embodiments.

In the breaker 1 of the present embodiment, the movable piece 4 may be fixed between the case main body 7 and the lid member 8, for example, as shown in WO2011/105175.

Further, the movable piece 4 may be fixed to a terminal piece embedded in the case main body 7 by welding, for example, as shown in Japanese Patent Application Publication No. 2020-035515.

That is, the breaker 1 according to the present invention is a breaker 1 which has at least a fixed piece 2 having a fixed contact 21;

a movable piece 4 which has an elastic portion 44 being elastically deformable, and a movable contact 41 in one end portion of the elastic portion 44, and which presses the movable contact 41 so as to contact with the fixed contact 21;

a thermally-actuated element 5 which is deformed in response to temperature changes so as to shift the movable piece 4 from a conductive state in which the movable contact 41 contacts with the fixed contact 21 to a cut-off state in which the movable contact 41 is separated from the fixed contact 21; and a resin case 10 having a recessed portion 73 for accommodating the thermally-actuated element 5, wherein it is suffice to satisfy the following:

the fixed piece 2 has an embedded portion 25 embedded in the resin case 10 in a region which overlaps with the thermally-actuated element 5 in a plan view viewed in the thickness direction of the fixed piece 21; and the resin case 10 has an outer peripheral portion 74 formed on the outer perimeter of the recessed portion 73, a first penetrating portion 75 penetrating the recessed portion 73 to expose the embedded portion 25 toward the thermally-actuated element 5, an island portion 76 interposed between the fixed piece 2 and the thermally-actuated element 5 in the inside of the first penetrating portion, and a connecting portion 77 connecting between the outer peripheral portion 74 and the island portion 76.

Further, the breaker 1 according to the present invention is a breaker 1 which has at least a fixed piece 2 having a fixed contact 21, a movable piece 4 which has an elastic portion 44 being elastically deformable, and a movable contact 41 in one end portion of the elastic portion 44, and which presses the movable contact 41 so as to contact with the fixed contact 21;

a thermally-actuated element 5 which is deformed in response to temperature changes so as to shift the movable piece 4 from a conductive state in which the movable contact 41 contacts with the fixed contact 21 to a cut-off state in which the movable contact 41 is separated from the fixed contact 21; and a resin case 10 having a recessed portion 73 for accommodating the thermally-actuated element 5, wherein it is suffice to satisfy the following:

the fixed piece 2 has an embedded portion 25 embedded in the resin case 10 in a region which overlaps with the thermally-actuated element 5 in a plan view viewed in the thickness direction of the fixed piece 2; and the resin case 10 has an outer peripheral portion 74 formed on the outer perimeter of the recessed portion 73, a first penetrating portion 75 penetrating the recessed portion 73 to expose the embedded portion 25 toward the thermally-actuated element 5, an island portion 76 interposed between the fixed piece 2 and the thermally-actuated element 5 in the inside of the first penetrating portion, a bottom portion 71 covering the bottom surface of the fixed piece 2, and a window portion 72 penetrating the bottom portion 71 to expose a part of the bottom surface of the fixed piece 2.

Meanwhile, the breaker 1 etc. according to the present invention can be widely applied to secondary battery packs, safety circuits for electrical devices, etc. FIG. 11 shows a secondary battery pack 500. The secondary battery pack 500 comprises a secondary battery 501 and the breaker 1 provided in an output circuit of the secondary battery 501.

FIG. 12 shows a safety circuit 502 for an electrical device. The safety circuit 502 includes the breaker 1 in series in an output circuit of a secondary battery 501.

According to the secondary battery pack 500 or the safety circuit 502 which includes the breaker 1, it is possible to realize the secondary battery pack 500 or the safety circuit 502 capable of providing stable conduction even when used at extremely low temperatures.

DESCRIPTION OF THE REFERENCE SIGNS

1: Breaker
2: Fixed piece
2a: Bottom surface
4: Movable piece
5: Thermally-actuated element
6: Thermistor
10: Resin case
21: Fixed contact
25: Embedded portion
26: Through-hole
41: Movable contact
43: Embedded portion
44: Elastic portion
71: Bottom portion
72: Window portion
73: Recess
74: Outer peripheral portion
75: First penetrating portion
76: Island portion
76a: Second penetrating portion
77: Connecting portion
77a: Rib
500: Secondary battery pack
501: Secondary battery
502: Safety circuit
771: First connecting portion
772: Second connecting portion
773: Third connecting portion
774: Protruding portion

The invention claimed is:

1. A breaker comprising:

a fixed piece which has a fixed contact;

a movable piece which has an elastic portion being elastically deformable, and a movable contact in one end portion of the elastic portion, and which presses the movable contact so as to contact with the fixed contact;

a thermally-actuated element which is deformed in response to temperature changes so as to shift the movable piece from a conductive state in which the movable contact contacts with the fixed contact to a cut-off state in which the movable contact is separated from the fixed contact; and a resin case which has a recessed portion for accommodating the thermally-actuated element, wherein the fixed piece has an embedded portion which is embedded in the resin case in a region which, in a plan view viewed in a thickness direction of the fixed piece, overlaps with the thermally-actuated element, and the resin case has an outer peripheral portion which is formed on the outer perimeter of the recessed portion, a first penetrating portion which penetrates the recessed portion so as to expose the embedded portion to a thermally-actuated element side, and an island portion which is, in an inside of the first penetrating portion, interposed between the fixed piece and the thermally-actuated element, and a connecting portion which connects between the outer peripheral portion and the island portion.

2. The breaker as set forth in claim 1, wherein the connecting portion comprises a rib protruding toward the thermally-actuated element.

3. The breaker as set forth in claim 1, wherein the fixed piece has a through-hole, and the outer peripheral portion and the connecting portion are connected by resin filled in the through-hole.

4. The breaker as set forth in claim 1, wherein the resin case has a bottom portion covering the bottom a bottom surface of the fixed piece, and a window portion penetrating the bottom portion to expose the bottom surface.

5. The breaker as set forth in claim 1, which further comprises a positive characteristic thermistor, and the island portion is provided with a second penetrating portion for mounting the positive characteristic thermistor so that the fixed piece and the thermally-actuated element are electrically connected through the positive characteristic thermistor.

6. The breaker as set forth in claim 5, wherein the connecting portion includes first connecting portions extending from the island portion to opposite sides in a longer direction of the movable piece, and second connecting portions extending from the island portion to opposite sides in a shorter direction of the movable piece.

7. The breaker as set forth in claim 1, wherein the connecting portion includes a third connecting portion extending in a longer direction of the movable piece from the island portion toward a side opposite to the fixed contact.

8. The breaker as set forth in claim 7, wherein the resin case comprises protruding portions protruding from the island portion to opposite sides in the shorter direction of the movable piece.

9. The breaker as set forth in claim 8, wherein the protruding portions terminate before the outer peripheral portion.

10. A breaker comprising:

a fixed piece which has a fixed contact;

a movable piece which has an elastic portion being elastically deformable, and a movable contact in one end portion of the elastic portion, and which presses the movable contact so as to contact with the fixed contact;

a thermally-actuated element which is deformed in response to temperature changes so as to shift the movable piece from a conductive state in which the movable contact contacts with the fixed contact to a cut-off state in which the movable contact is separated from the fixed contact; and a resin case which has a recessed portion for accommodating the thermally-actuated element, wherein the fixed piece has an embedded portion which is embedded in the resin case in a region which, in a plan view viewed in a thickness direction of the fixed piece, overlaps with the thermally-actuated element, and the resin case has an outer peripheral portion which is formed on the outer perimeter of the recessed portion, a first penetrating portion which penetrates the recessed portion so as to expose the embedded portion to a thermally-actuated element side, and an island portion which is, in an inside of the first penetrating portion, interposed between the fixed piece and the thermally-actuated element, a bottom portion which covers a bottom surface of the fixed piece, and a window portion which penetrates the bottom portion and exposes the bottom surface.

11. The breaker as set forth in claim 10, wherein the first penetrating portion and the window portion partially overlap in the plan view.

12. The breaker as set forth in claim 1, wherein the thermally-actuated element is formed in a rectangular shape in the plan view, and the first penetrating portion is provided at positions opposed to the to four corners of the thermally-actuated element.

13. A safety circuit for an electrical device, comprising the breaker as set forth in claim 1.

14. A secondary battery pack comprising the breaker as set forth in claim 1.

15. A safety circuit for an electrical device, comprising the breaker as set forth in claim 10.

16. A secondary battery pack comprising the breaker as set forth in claim 10.

* * * * *